United States Patent
Ismert et al.

(10) Patent No.: US 6,402,096 B1
(45) Date of Patent: *Jun. 11, 2002

(54) APPARATUS FOR SUPPORTING CONDUIT BETWEEN BUILDING MEMBERS

(75) Inventors: Joseph P. Ismert; Victor M. Carr; Frank D. Julian, all of Kansas City, MO (US); Arthur B. Hicks, Overland Park, KS (US); Richard D. Thomas, Harrisonville, MO (US)

(73) Assignee: Sioux Chief Mfg. Co., Inc., Peculiar, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/702,473

(22) Filed: Oct. 31, 2000

Related U.S. Application Data (63) Continuation-in-part of application No. 09/356,640, filed on Jul. 19, 1999, which is a continuation-in-part of application No. 08/965,302, filed on Nov. 6, 1997, now Pat. No. 6,126,122.

(51) Int. Cl.[7] .................................................. F16L 3/08
(52) U.S. Cl. .................... 248/68.1; 248/68.1; 248/74.1; 248/74.4; 24/271
(58) Field of Search ........................... 248/68.1, 65, 69, 248/73, 49, 57, 74.1, 74.3, 74.4, 200.1, 298.1, 220.21, 292.12, 230.5, 231.61, 316.6; 24/27, 525, 129 A, 135 R (56) References Cited

U.S. PATENT DOCUMENTS

| | | | | |
|---|---|---|---|---|
| 998,112 A | * | 7/1911 | Murray | 248/74 |
| 2,884,214 A | * | 4/1959 | Wrobel | 248/74 |
| 2,890,848 A | * | 6/1959 | Johnson, Jr. | 248/74 |
| 2,904,294 A | | 9/1959 | Marygold | |
| 2,931,607 A | | 4/1960 | McFarland | |
| 3,147,754 A | * | 9/1964 | Koessler | 128/346 |
| 3,163,386 A | | 12/1964 | Collins | |
| 3,718,307 A | | 2/1973 | Albanese | |
| 3,848,840 A | | 11/1974 | Umerzu | |
| 4,076,199 A | | 2/1978 | Paulsen | |
| 4,244,083 A | | 1/1981 | Aremka | |
| 4,395,009 A | | 7/1983 | Bromke | |
| 4,717,101 A | | 1/1988 | Harrod | |
| 4,768,741 A | | 9/1988 | Logsdon | |
| 4,779,828 A | * | 10/1988 | Munch | 248/74.3 |

(List continued on next page.)

OTHER PUBLICATIONS

Sioux Chief Manufacturing Company, Inc.'s Catalog #898, p. 9 "Slider™", Slider Plumbing, HVAC & Conduit Brackets shown therein were on sale more than one year prior to the filing date of the present application.

Sioux Chief Manufacturing Company, Inc.'s Catalog #898, p. 8 "Edge" support bracket shown therein were on sale more than one year prior to the filing date of the present application.

*Primary Examiner*—Kimberly T. Wood
(74) *Attorney, Agent, or Firm*—Shughart Thomson & Kilroy P.C.

(57) ABSTRACT

A plumbing slider bracket and ratchet arm conduit clamp includes a slider bracket with an inner bracket section which is telescopically received within an outer bracket section such that it is slidable back and forth within the outer bracket section to make an extendable slider bracket. Flexible tabs extending from either end of the slider bracket allow attachment of the bracket to an outer stud surface, or within the stud spacing in any desired orientation. Each ratchet arm conduit clamp is received by the slider bracket and is movable along the length of the slider bracket until a conduit is clamped therein. The clamping action both secures the conduit in place within the clamp, and also forces a resilient insert downward against the bottom wall of the slider bracket to anchor the clamp in position within the slider bracket.

18 Claims, 5 Drawing Sheets

U.S. PATENT DOCUMENTS

| | | |
|---|---|---|
| 5,060,892 A | 10/1991 | Dougherty |
| 5,149,026 A | 9/1992 | Allen |
| 5,150,865 A | 9/1992 | Miller |
| 5,303,887 A * | 4/1994 | Hasty et al. ............... 248/68.1 |
| 5,855,342 A * | 1/1999 | Hawkins et al. ........... 248/68.1 |
| 5,992,802 A * | 11/1999 | Campbell ................... 248/68.1 |
| 6,126,122 A * | 10/2000 | Ismert ........................ 248/74.1 |

* cited by examiner

APPARATUS FOR SUPPORTING CONDUIT BETWEEN BUILDING MEMBERS

CROSS REFERENCE TO RELATED APPLICATIONS

This application is a continuation-in-part of application Ser. No. 09/356,640, entitled PLUMBING SLIDER BRACKET AND DOUBLE RATCHET ARM PIPE CLAMP ASSEMBLY, which was filed on Jul. 19, 1999 and application Ser. No. 08/965,302, entitled. PLUMBING SLIDER BRACKET AND DOUBLE RATCHET ARM PIPE CLAMP ASSEMBLY, which was filed on Nov. 6, 1997 now U.S. Pat. No. 6,126,122.

FIELD OF THE INVENTION

The present invention relates to a slider bracket and clamp system for plumbing support, and, more particularly, to such a slider bracket in which a first and a second U-shaped bracket section are shaped to allow the first bracket section to be telescopically received in the second bracket section such that it can slide back and forth within the second bracket section to collectively make a single, length adjustable, slider bracket. One or more flexible tabs are provided on the exposed end of each of the first and second bracket sections. A special ratchet operated pipe clamp assembly has a base which is shaped to be received and retained in either the first or the second bracket section and the clamp assembly is designed such that, when a pipe is secured in place within the clamp assembly, a resilient insert within the clamp base is forced into contact with a bottom wall of the slider bracket to anchor the clamp, and the secured pipe, stationary with respect to the slider bracket.

BACKGROUND OF THE INVENTION

Manufacturers of plumbing supplies are constantly seeking to improve the convenience and efficiency of their products for the tradesman. Brackets and plumbing supports are increasingly designed for ease of installation and for universal application. An early example of an adjustable bracket is illustrated and described in U.S. Pat. No. 3,163,386, entitled Adjustable Duct Hanger. In this patent, an "outer" and an "inner rectilinear member" are engaged with each other such that they can be telescopically extended and retracted relative to each other. A prong is attached to the terminal end of each of the telescoping members such that the bracket can be telescopically extended to the full width of an adjacent pair of joists where a duct is to be supported and the prongs driven into the sides of the joists to hold the bracket, and the duct, in place. While the '386 patent discusses duct support, it can also be used for plumbing support as well.

An example of a plumbing bracket which is designed for easy installation in a variety of different environments is found in U.S. Pat. No. 5,060,892 to Glen Dougherty, entitled Plumbing Hanger Bracket Assembly. The Dougherty bracket is a slider bracket in which a first bracket section is received within a second, slightly larger bracket section such that the first bracket section can be telescopically extended and retracted relative to the second section to adjust the overall length of the bracket. The bracket has a plurality of spaced openings in the rear of the bracket and a plastic pipe support sleeve is received within the combined bracket sections such that, when the sleeve is aligned with one of the openings in the bracket a plumbing pipe can extend straight through the sleeve and bracket to be supported thereby. The Dougherty bracket is designed primarily for installation of hot and cold water supply pipes behind plumbing installations such as tub and shower or lavatory supplies. However, brackets such as Dougherty's are very limited in their application. They are capable only of supporting pipes extending from front to back through the bracket, and the support sleeves do not lock into place, but are slidable within the bracket, i.e. they are held in position only by the pipes themselves. Placement of supported pipes is also limited by the placement of the bracket openings.

It is clear that a need exists for a slider bracket which is length adjustable to allow installation in a variety of plumbing support applications between wall studs, floor and ceiling joists, and other building members and to allow for installation either inside or outside of the building component pairs. Such a slider bracket should allow pipes to be supported in any orientation relative to the opening in which it is positioned and should accommodate specialized pipe clamp assemblies which can be secured into a stable position along the length of the bracket.

SUMMARY OF THE INVENTION

The present invention is directed to a plumbing slider bracket and clamp assembly for securing plumbing pipes or other conduit in fixed positions within spaces defined by adjacent wall studs, joists and other building or bracketing members. The slider bracket includes inner and outer bracket sections which are U-shaped in cross section, each of which has opposing depending extensions extending into the U shaped channel. The inner bracket section is slightly smaller in dimension that the outer bracket section which allows the inner bracket section to be telescopically received within the outer bracket section such that it is slidable back and forth within the outer bracket section to collectively make a single, length adjustable slider bracket. At least one respective flexible tab is provided on the distal ends of each of the inner and outer bracket sections with the tabs extending in opposing directions and being foldable between an extended position which allows the bracket to be installed on the outside of a pair of stud or joists, i.e. the tabs can be attached to the outer stud surface, or bent inward at a 90 degree angle relative to the bracket which allows the bracket to be installed within the stud spacing in any desired orientation, i.e. the tabs are attached to the inward facing stud or joist surface.

Specialized double ratchet arm pipe clamp assemblies for use in the slider bracket are of a three part construction with a base member, a resilient insert and a keeper block engageable with the resilient insert within the base member to clamp a pipe therebetween. Each base member has a rectangular base frame with two pair of opposing gripping steps formed in it at different levels such that it can be received and retained in either the first or the second, or both slider bracket sections. Each base member has a pair of elongate ratchet arms extending outward or upward from the base frame. Each ratchet arm has a plurality of ratchet teeth formed along an outside surface. Each keeper block has a pair of ratchet arm receiving apertures extending through opposite ends thereof, with each arm receiving aperture having an anvil surface. A respective pawl member is positioned within each aperture with each pawl member being resiliently urged toward the anvil surface of the respective aperture. The keeper block is received on the clamp base member with each ratchet arm extending through a respective arm receiving aperture. The ratchet teeth on each ratchet arm engage the respective pawl member in the aperture through which the arm extends. Each pawl member includes an extension which protrudes outward from the keeper block which, if pushed outward, disengages the pawl member from the ratchet teeth to thereby release the ratchet arm.

The resilient insert is designed to accomplish two functions, i.e. it forms a resilient upper surface which combines with the keeper block to clamp a pipe in place and, as the keeper block is cinched down against the pipe, the clamped pipe exerts a force against the resilient upper surface, which forces it downward to engage the bottom wall of the slider bracket, thus firmly anchoring the clamp assembly in place within the slider bracket.

An alternative embodiment of the pipe clamp assembly is similar to the double ratchet arm pipe clamp assembly except that it includes only a single ratchet arm which is longer and more flexible than those of the double ratchet arm assembly. The flexible ratchet arm is adapted to be looped over a pipe cradled against the upper surface of the resilient insert and pulled downwardly into a ratchet arm receiving aperture connected to the clamp base frame. The flexible ratchet arm is cinched down against the pipe, simultaneously anchoring the pipe in place relative to the clamp assembly and forcing the resilient insert downward to anchor the clamp assembly in place within the slider bracket.

OBJECTS AND ADVANTAGES OF THE INVENTION

The principal objects of the present invention include: providing a plumbing slider bracket and double ratchet arm pipe clamp assembly; providing such a plumbing slider bracket and double ratchet arm pipe clamp assembly which can be telescopically extended to fit between studs, joists, or other building members spaced at varying widths; providing such a plumbing slider bracket and double ratchet arm pipe clamp assembly in which the slider includes a first bracket section telescopically received within a second bracket section; providing such a plumbing slider bracket and double ratchet arm pipe clamp assembly in which a number of the double ratchet arm clamp assemblies can be securely fitted into a single slider bracket, either in a portion of the slider bracket where the first and second bracket sections overlap, or in a portion where they do not overlap; providing such a plumbing slider bracket and double ratchet arm pipe clamp assembly including an insert extending through a base member of the pipe clamp assembly, an upper surface of which engages a pipe secured therein and a lower surface which is driven into a bottom wall of the slider bracket to prevent sliding of the base member relative to the slider bracket; providing such a plumbing slider bracket and double ratchet arm pipe clamp assembly in which each double ratchet arm pipe clamp assembly includes a resilient insert which provides a cushioned clamping surface for securing a pipe in position within the clamp assembly and which also pushes downward against the bottom wall of the slider bracket in response to clamping forces applied to the pipe which causes the pipe clamp assembly to be anchored in position within the slider bracket; providing such a plumbing slider bracket and double ratchet arm pipe clamp assembly which is universally useful to hold plumbing pipes in place within a structure regardless of their configuration, spacing and routing; and providing such a plumbing slider bracket and double ratchet arm pipe clamp assembly which is effective yet economical and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

First Embodiment of the Slider Bracket

Figures 1, 2, 3:
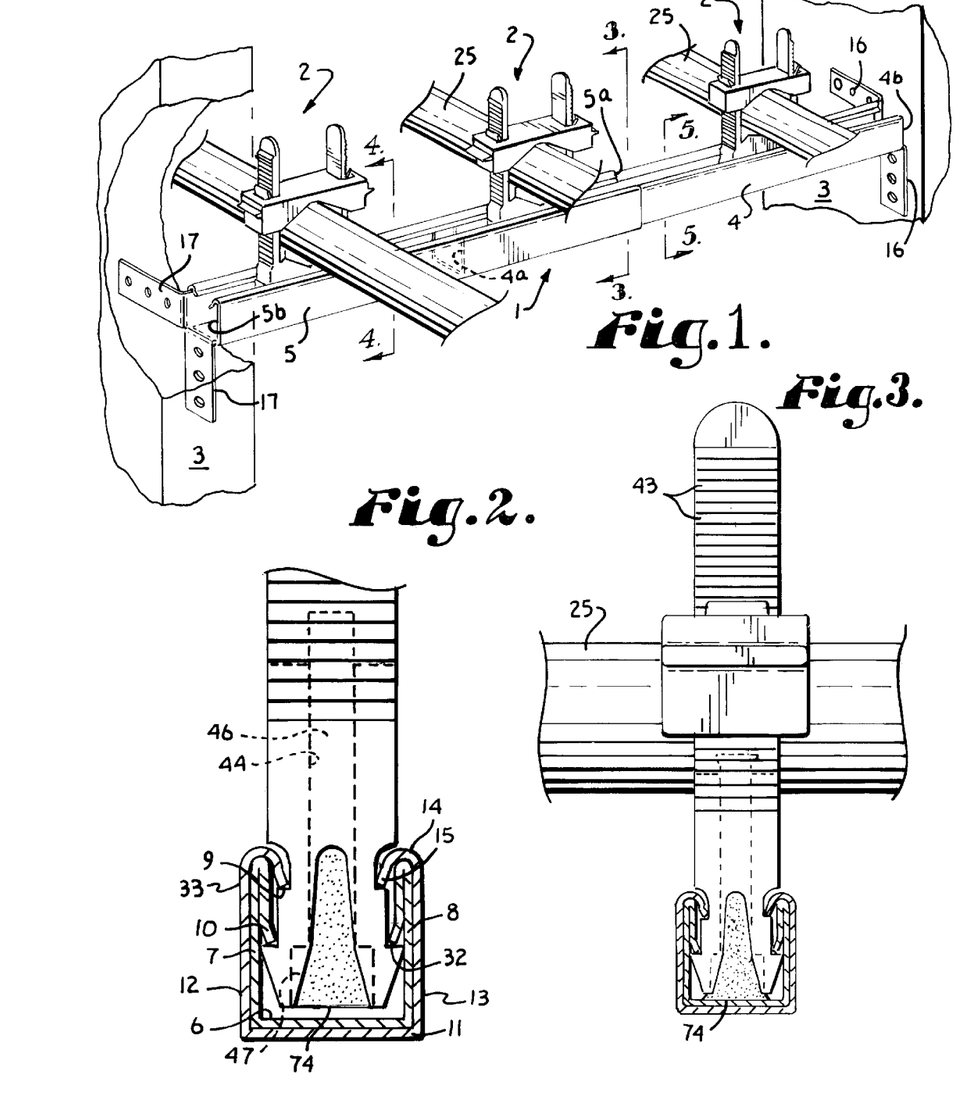
FIG. 1 is a perspective view of a first embodiment of a plumbing slider bracket secured in position between a pair of wall studs with three double ratchet arm pipe clamp assemblies respectively securing three pipes in position, as for a tub and shower stub out.
FIG. 2 is a greatly enlarged, fragmentary, cross sectional view of the plumbing slider bracket and double ratchet arm pipe clamp assembly of FIG. 1, taken along line 3—3 of FIG. 1, but with no pipe clamped in position within a clamp assembly, and thus with the resilient insert undistorted.
FIG. 3 is an enlarged, cross sectional view of the plumbing slider bracket and double ratchet arm pipe clamp assembly of FIG. 1, taken along line 3—3 of FIG. 1, but with a pipe secured in a pipe clamp assembly and the resilient insert distorted thereby into contact with the bottom wall of the slider bracket.

Referring to FIG. 1, an inventive plumbing slider bracket and pipe clamp assembly including a plumbing slider bracket 1 and three double ratchet arm pipe clamp assemblies 2 is illustrated as being installed between two wall studs 3. The slider bracket 1 (FIGS. 7 and 8) includes an inner bracket section 4 and an outer bracket section 5 which are each substantially U-shaped in cross section with the inner bracket section 4 being slightly smaller in dimension that the outer bracket section 5, which allows the inner bracket section 4 to be telescopically received within the outer bracket section 5.

Figure 5:
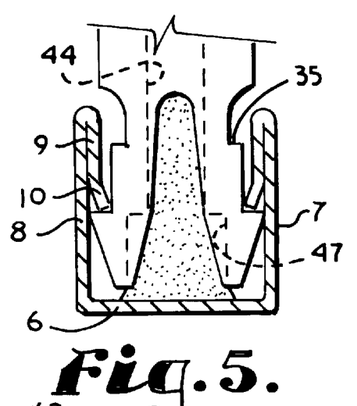
FIG. 5 is a greatly enlarged, fragmentary, cross sectional view of the plumbing slider bracket and double ratchet arm pipe clamp assembly of FIG. 1, taken along line 5—5 of FIG. 1, showing a pipe clamp assembly being retained by just the inner slider section.

Referring to FIGS. 1 and 3, the inner bracket section 4 has a proximate end 4a, a distal end 4b, and a bottom wall 6 connecting a front wall 7 to a rear wall 8. The front and rear walls 7 and 8 each have a respective wall extension or flange 9 which extends inwardly from the respective front wall 7 or rear wall 8 and downwardly toward the bottom wall 6. The wall extensions 9 are bent back on the respective front wall 7 or rear wall 8 at approximately 180 degrees as shown in FIG. 5, and include a depending ridge 10 which extends along the length of the inner bracket section 4 and extends inward from the wall extensions 9 into the channel formed by the front and rear walls 7 and 8 and the bottom wall 6. The ridges 10 thus present opposing gripping surfaces within the inner bracket section 4 for retention of the pipe clamp assemblies 2 or 202, as will be fully explained below.

Figure 4:
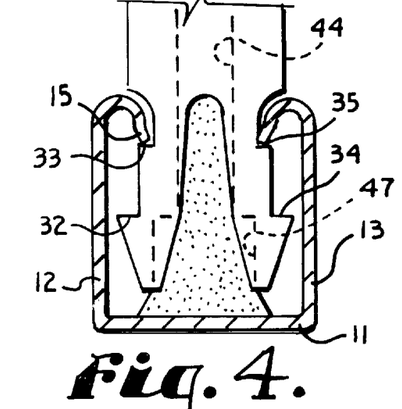
FIG. 4 is a greatly enlarged, fragmentary, cross sectional view of the plumbing slider bracket and double ratchet arm pipe clamp assembly of FIG. 1, taken along line 4—4 of FIG. 1, showing a pipe clamp assembly being retained by just the outer slider section.

Similarly, the outer bracket section 5 also has a proximate end 5a, a distal end 5b, and a bottom wall 11 connecting a front wall 12 to a rear wall 13. Each of the front and rear walls 12 and 13 has a respective wall extension or flange 14. The wall extensions 14 are bent back from the respective front or rear wall 12 or 13 at approximately 180 degrees as shown in FIG. 4, and include a depending ridge 15 which extends along the length of the outer bracket section 5 and extends inward from the wall extensions 14 into the channel formed by the front and rear walls 12 and 13 and the bottom wall 11. The ridges 15 thus also present opposing gripping surfaces within the outer bracket section 5 for retention of the pipe clamp assemblies 2, as explained below. A preferred angle for both the ridges 10 and 15 is approximately 20 degrees from vertical.

Figures 7, 8:
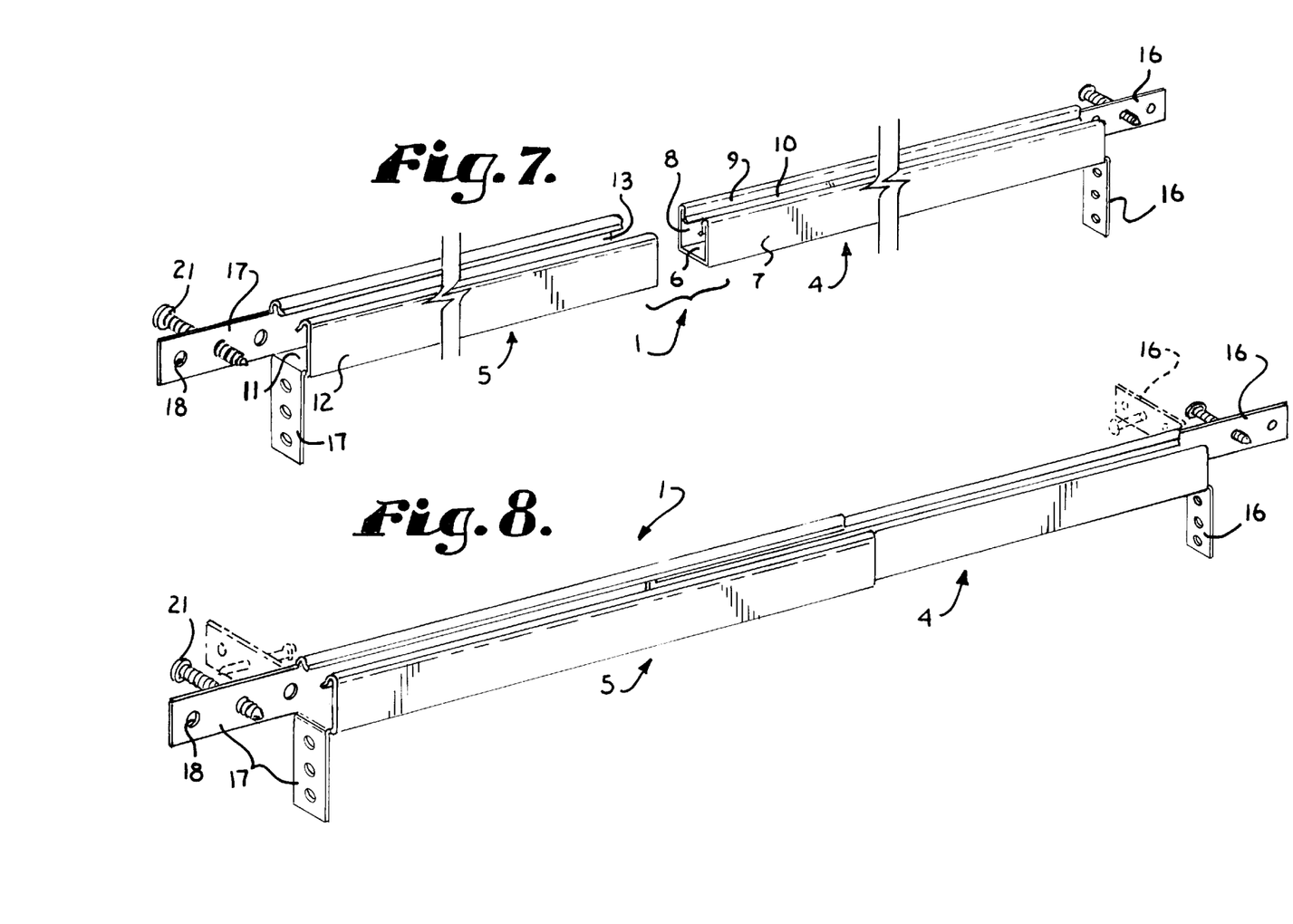
FIG. 7 is an exploded view of the first embodiment of the inventive slider bracket.
FIG. 8 an assembled view of the slider bracket of FIG. 7.

The slider bracket 1 also includes at least one, and preferably two flexible tab 16 which are attached to and extend outward from the distal end 4b of the inner bracket section 4 and at least one and preferably two matching, flexible tabs 17, attached to and extending outward from the distal end 5b of the outer bracket section 5. The tabs 16 and 17 may, respectively, extend outward from the rear walls 8 and 13, the bottom walls 6 and 11, the front walls 7 and 12, or any combination of the above. The tabs 16 and 17 preferably include a number of pre-drilled holes 18 which accommodate fasteners, such as screws 21 (FIGS. 7 and 8). The screws 21 can be factory "pre-loaded" into the holes 18 in the tabs 16 and 17 for ease of use by plumbers in the field.

The tabs 16 and 17 are flexible enough that they can be easily bent to an angle of at least 90 degrees to allow the slider bracket 1 to be attached to the inward facing surface of two adjacent building members, such as within a wall between the studs 3, as shown in FIG. 1. Alternatively, the tabs 16 and 17 can be left in the extended position of FIGS. 7 and 8 to allow the slider bracket 1 to be installed on the outside surface of a single or an adjacent pair of studs, joists, etc.

Double Ratchet Arm Pipe Clamp Assembly

Figure 6:
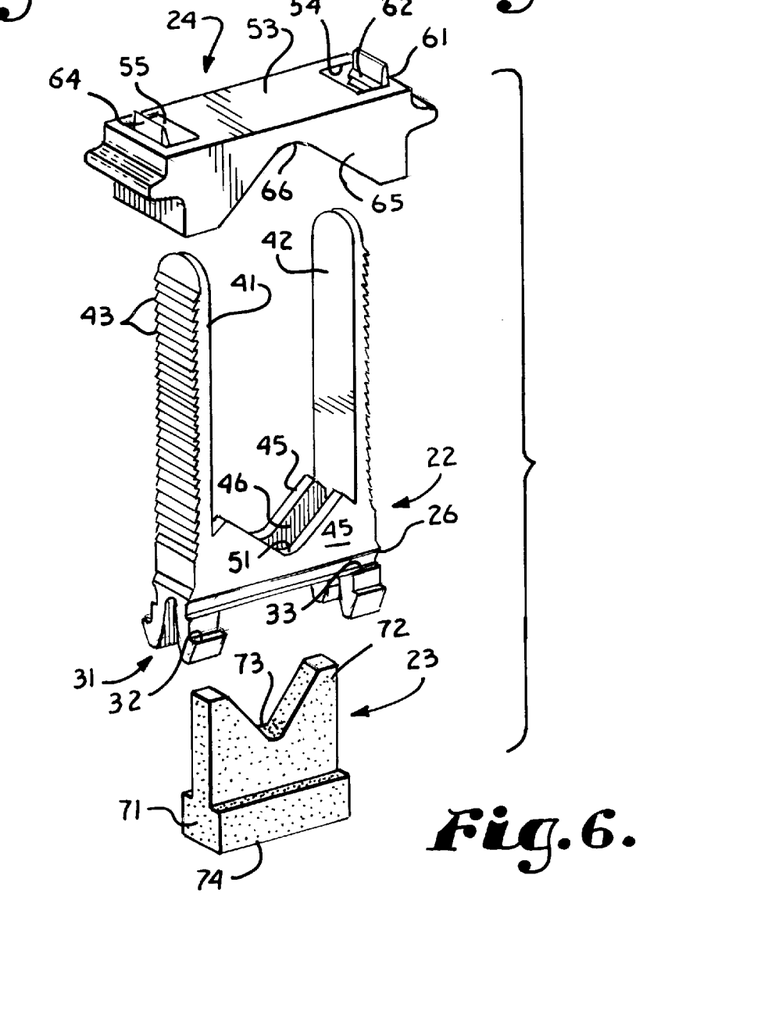
FIG. 6 is an exploded view of one of the inventive double ratchet arm pipe clamp assemblies designed for use with either the slider bracket of FIGS. 7 and 8 or the slider bracket of FIG. 9.

The first embodiment of the pipe clamp assembly for use with the slider bracket 1 is a double ratchet arm pipe clamp assembly 2 of a three part construction, as shown in FIG. 6. Each clamp assembly 2 includes a base member 22, a resilient insert 23, and a keeper block or clamping member 24 engageable with the resilient insert 23 and with the clamp base member 22 to clamp a pipe 25 therebetween. Each base member 22 has a substantially rectangular base frame 26 with two pairs of depending legs 31, each with a lower gripping step 32 and an upper gripping step 33 formed therein.

Figure 12:
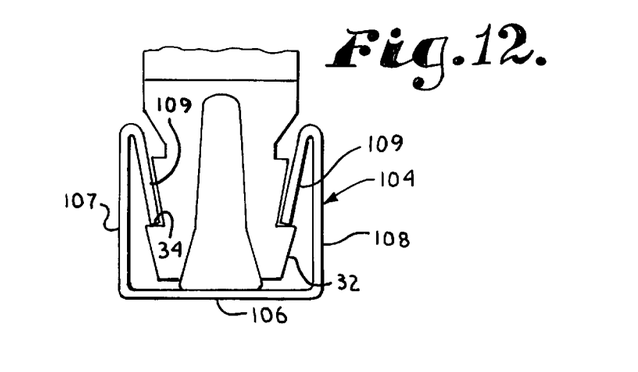
FIG. 12 is a greatly enlarged, fragmentary end view of the second embodiment of the inventive slider bracket and a double ratchet arm pipe clamp assembly which shows the pipe clamp assembly being retained by just the inner slider section.

Each clamp assembly 2 can be snapped into position within the slider bracket 1 or, alternatively, slid into the bracket from the open ends of the channels formed in the inner bracket section 4 or the outer bracket section 5. When the clamp assemblies 2 are placed into the slider bracket 1 (as shown in FIG. 2), the opposing lower gripping steps 32 engage the ridges 10 of the inner bracket section 4 while the opposing upper gripping steps 33 engage the ridges 15 of the outer bracket section 5. This insures that the clamp assemblies 2 will be securely held in place within the slider bracket 1 at portions of the slider bracket 1 where the inner bracket section 4 overlaps the outer bracket section 5. In addition, the clamp assemblies 2 will be securely held in place within the slider bracket 1 at portions where the inner bracket section 4 is telescoped away from the outer bracket section 5 or by the lower gripping steps 32, as shown in FIGS. 5 and 12, and at portions where the outer bracket section 5 is telescoped away from the first bracket section 4 by the upper gripping steps 33, as shown in FIG. 4.

Each of the lower gripping steps 32 has a top surface 34 and each of the upper gripping steps 33 has a top surface 35, with the surfaces 34 and 35 each preferably extending outward and downward slightly at an angle of approximately 5 degrees from horizontal. The upper gripping step 33 can extend lengthwise along the entire base frame 26 to provide a more effective gripping surface. Experimentation has shown that the approximate 5 degree angles of the gripping step top surfaces 34 and 35 and the approximate 20 degree angle of the ridges 10 and 15 allow the base frame 26 to be easily snapped into position within the slider bracket 1 while making it very difficult to remove the clamp assembly 2 by pulling outward on it or twisting it.

Each pipe clamp assembly base member 22 is preferably made of molded plastic and also includes a pair of elongated ratchet arms 41 and 42 extending outward from the base frame 26. Each ratchet arm 41 and 42 has a plurality of ratchet teeth 43 formed along an outside surface thereof. The clamp base frame 26 includes a central aperture 44 and a pair of upstanding walls 45 positioned on respective sides of an upper portion 46 of the central aperture 44 which walls 45 each include a notch 51 for cradling a pipe, such as the pipes 25 of FIGS. 1 and 3. The notch 51 may be substantially V-shaped, U-shaped, or semicircular in configuration. The central aperture 44 also includes a lower portion 47 which may be smaller or larger in cross sectional area than the upper portion 46.

Each clamp keeper block 24 includes a keeper block plate 53 with a pair of arm receiving apertures 54 formed therethrough near respective opposite ends and sized to receive respective ones of the ratchet arms 41 and 42, as shown in FIGS. 1, 3 and 6. Each of the arm receiving apertures 54 has an inner anvil surface 55 and a respective pawl member 61 is positioned within and hingedly attached to an outside wall of the keeper block defining each aperture 54 with each pawl member 61 including a series of teeth 62 spaced to engage the corresponding ratchet teeth 43 on the respective ratchet arm 41 or 42 extending through the aperture 54. Each pawl member 61 is molded in a manner such that it is resiliently urged toward the anvil surface 55 of the respective aperture 54 so that the ratchet arm teeth 43 are captured by the teeth 62 on the pawl member 61. Each pawl member 61 includes an extension 64 which protrudes outward from the keeper block plate 53. The extensions 64, when pushed outward, disengage the pawl member teeth 62 from the ratchet teeth 43 to thereby release the ratchet arms 41 and 42.

The keeper block 24 also includes a pair of keeper block walls 65 positioned along respective sides of the keeper block plate 53 with each keeper block wall 65 also including a notch 66. As with the notches 51 of the base member 22, the notches 66 may be substantially V-shaped, U-shaped, or semicircular in configuration. When the keeper block 24 is ratcheted downward along the ratchet arms 41 and 42, the notches 66 on the keeper block 24 are positioned in opposition to the notches 51 on the base member 22 to cradle the pipe 25 therebetween.

The resilient insert 23 is preferably made of a flexible material which is compatible with all types of plastic used in plumbing applications, including CPVC (chlorinated polyvinyl chloride). Dow Affinity (TM) has proven to be a particularly acceptable material. The resilient insert 23 includes a base portion 71 with a first footprint which allows it to be received within the lower portion 47 of the base member central aperture 44, and an elongate upper portion 72 extending upward from the base portion 71 which has a second footprint which allows it to be received within the upper portion 46 of the base member central aperture 44.

The upper portion 72 of the resilient insert 23 is also shaped as a notch 73 with a shape that matches, but extends slightly above the notches 51 of the base member 22. The notch 73 of the resilient insert 23 forms a resilient receiving surface which receives a pipe 25, and is forced downward within the base member central aperture 44 as the keeper block 24 is ratcheted downward on the base member ratchet arms 41 and 42. This downward movement of the resilient insert 23 forces a bottom surface 74 of the base portion 72 to come into contact with the bottom wall 6 of the inner bracket section 4 and to spread outward along that bottom wall 6. Also, as shown in FIG. 4, in portions of the slider bracket 1 where the outer bracket section 5 is telescoped beyond that of the first bracket section 4, the bottom surface 74 will be forced downward into contact with the bottom wall 11 of the outer bracket section 5. This causes the clamp assemblies 2 to be anchored in a set position along the slider bracket 1 since the distorted base portion 71 forces the clamp upward so that the gripping steps 32 and 33 into contact with the respective ridges 10 and 15, thus forming a spring action which wedges the base frames 26 into place.

Second Embodiment of the Slider Bracket

An alternative version of the slider bracket 101, adapted for use with clamp assemblies 2, is shown in FIGS. 9–12. The slider bracket 101 includes an inner bracket section 104 and an outer bracket section 105 which are each substantially U-shaped in cross section with the inner bracket section 104 being slightly smaller in dimension that the outer bracket section 105, which allows the inner bracket section 104 to be telescopically received within the outer bracket section 105.

Figure 9:
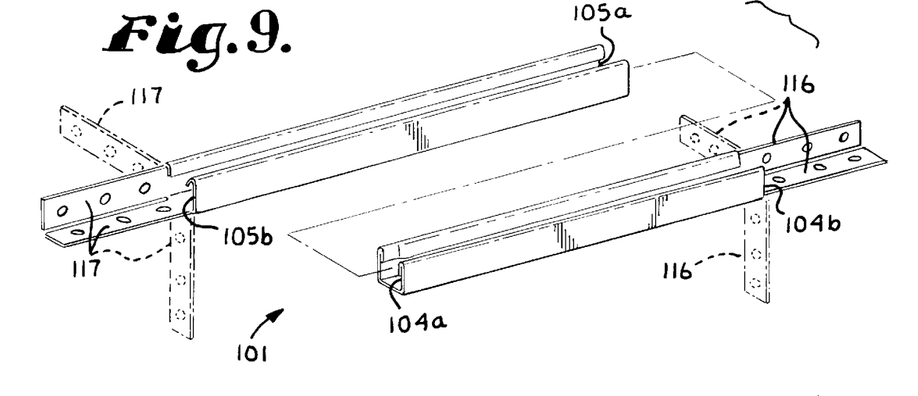
FIG. 9 is an exploded view of a second embodiment of the inventive slider bracket.

Referring to FIGS. 9 and 12, the inner bracket section 104 has a proximate end 104a, a distal end 104b, and a bottom wall 106 connecting a front wall 107 to a rear wall 108. The front and rear walls 107 and 108 each have a respective wall extension or flange 109 which extend inwardly from the respective front wall 107 or rear wall 108 and downwardly toward the bottom wall 106. The wall extensions 109 of the inner bracket section 104 are angled inwardly from the respective front wall 107 or rear wall 108 and downwardly toward the bottom wall 106 at an angle of approximately 15 degrees. The slider bracket 101 generally functions in the same manner as slider bracket 1, with the lower edges of the wall extensions 109 forming the gripping surfaces for retaining the pipe clamp assemblies 2. No ridges, such as the ridges 10 of the slider bracket 1, are required to perform this function in slider bracket 101.

Figure 11:
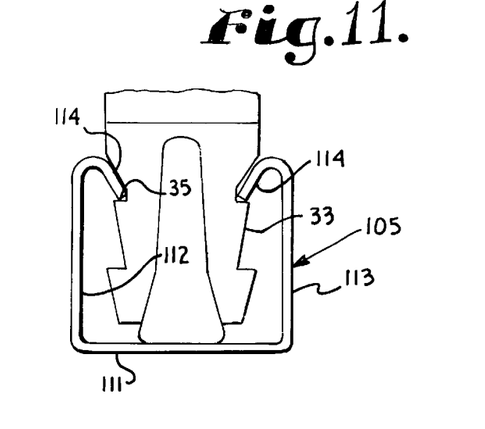
FIG. 11 is a greatly enlarged, fragmentary end view of the second embodiment of the inventive slider bracket and a double ratchet arm pipe clamp assembly which shows the pipe clamp assembly being retained by just the outer slider section.

The outer bracket section 105, as best seen in FIGS. 9 and 11, has a proximate end 105a, a distal end 105b, and a bottom wall 111 connecting a front wall 112 to a rear wall 113. Each of the front and rear walls 112 and 113 has a respective wall extension or flange 114. The wall extensions 114 of the outer bracket section 105 are angled inwardly from the respective front wall 112 or rear wall 113 and downwardly toward the bottom wall 111 at an angle of approximately 30 degrees with the lower edge of the wall extension 114 performing the gripping function of the ridges 15 of the slider bracket 1.

As with the slider bracket 1, the slider bracket 101 includes at least one, and preferably two, flexible tabs 116 which are attached to and extend outward from the distal end 104b of the inner bracket section 104 and at least one, and preferably two, matching, flexible tabs 117, attached to and extending outward from the distal end 105b of the outer bracket section 105. The flexible tabs 116 and 117 are structurally and functionally identical to the flexible tabs 16 and 17 of the slider bracket 1 described above.

Figure 10:
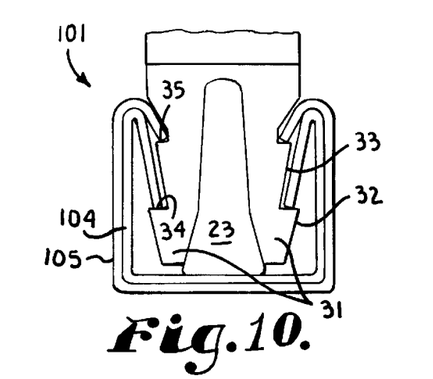
FIG. 10 is a greatly enlarged, fragmentary end view of the second embodiment of the inventive slider bracket and a double ratchet arm pipe clamp assembly.

When the clamp assemblies 2 are placed into the slider bracket 101 (as shown in FIG. 10), the opposing lower gripping steps 32 engage the lower edges of the wall extensions 109 of the inner bracket section 104 while the opposing upper gripping steps 33 engage the lower edges of the wall extensions 114 of the outer bracket section 105. This insures that the clamp assemblies 2 will be securely held in place within the slider bracket 101 at portions of the slider bracket 101 where the inner bracket section 104 overlaps the outer bracket section 105. In addition, the clamp assemblies 2 will be securely held in place within the slider bracket 101 at portions where the inner bracket section 104 is telescoped away from the outer bracket section 105 by the lower gripping steps 32, as shown in FIG. 12, and at portions where the outer bracket section 105 is telescoped away from the first bracket section 104 by the upper gripping steps 33, as shown in FIG. 11.

Similar to the slider bracket 1, the 30 degree angle of the wall extensions 114 and the 15 degree angle of the extensions 109 combine with the approximate 5 degree angle of the gripping step top surfaces 34 and 35 to allow the base frame 26 to be easily snapped into position within the slider bracket 101 while making it very difficult to remove the clamp assembly 2.

Flexible Ratchet Arm Pipe Clamp Assembly

Figures 13, 14, 15:
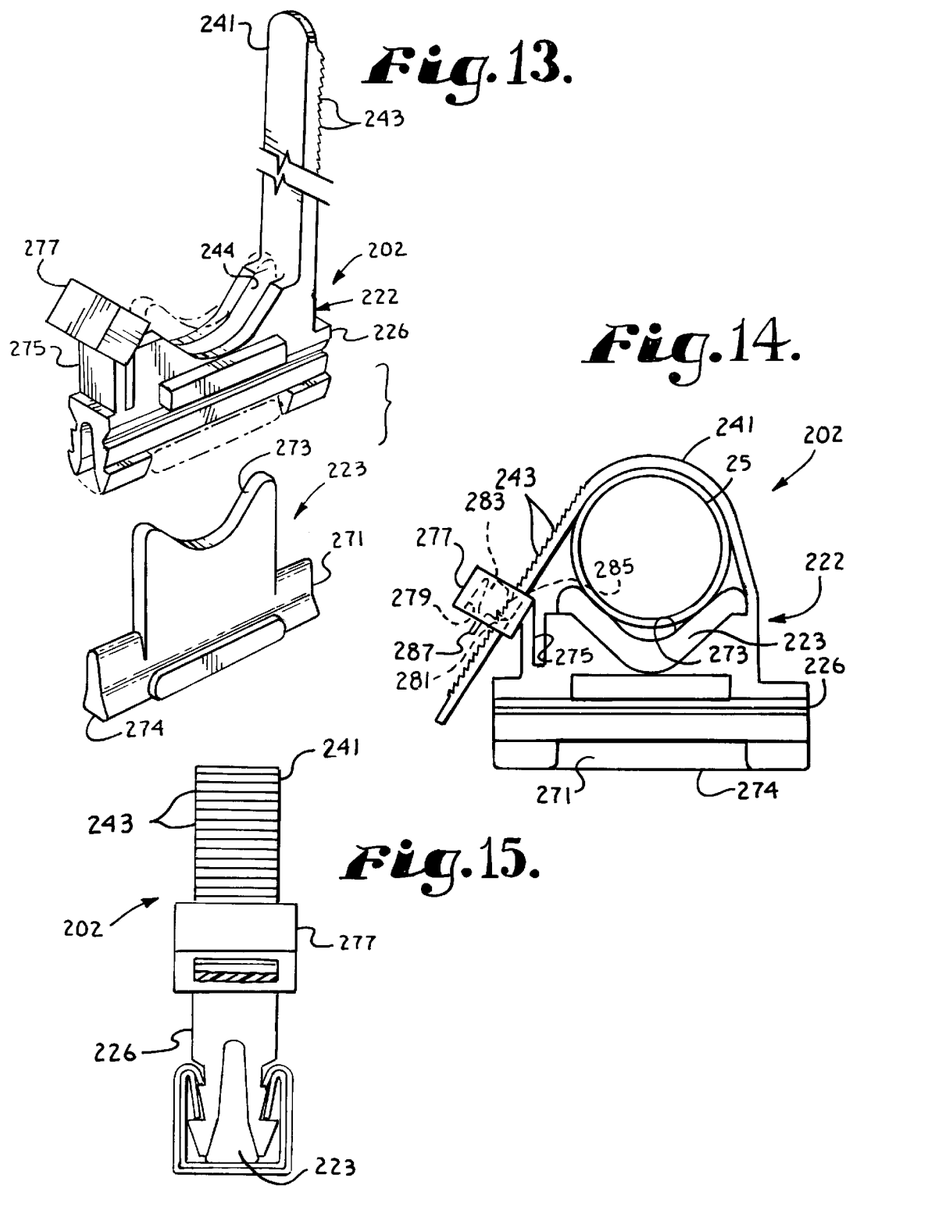
FIG. 13 is a partial, exploded, perspective view of a flexible ratchet arm pipe clamp assembly designed for use with either the slider bracket of FIGS. 7 and 8 or the slider bracket of FIG. 9.
FIG. 14 is a side view of the flexible ratchet arm pipe clamp assembly of FIG. 13.
FIG. 15 is an end view of the flexible ratchet arm pipe clamp assembly of FIG. 13 installed in the slider bracket of FIG. 12.

An alternative embodiment of the pipe clamp assembly is a flexible ratchet arm pipe clamp 202 as shown in FIGS.

13–15. Each clamp assembly 202 includes a base member or clamp base 222 with a base frame 226 which is similar in construction to the base frame 26 of the double ratchet arm pipe clamp assembly 2 described above. The base frame 226 accepts a resilient insert 223 which is generally identical to the insert 23 of the double ratchet arm clamp assembly 2. Unlike the double ratchet arm pipe clamp assembly 2, however, the flexible ratchet arm pipe clamp assembly 202 has only a single elongate flexible ratchet arm or ratchet strap 241 extending outwardly from the base frame 226 of the respective base member 222. The flexible ratchet arm 241 includes a plurality of ratchet teeth or ratchet members 243 formed along an outside surface thereof.

On the side of the base frame 226 opposite the flexible ratchet arm 241, the clamp assembly 202 includes an extension arm 275 having a head or ratchet arm receiving block or member 277 with a ratchet arm receiving aperture 279 formed therethrough and sized to receive the flexible ratchet arm 241. The arm receiving aperture 279 is angled downwardly and away from the flexible ratchet arm 241. The flexible ratchet arm 241 is longer and more pliable than the ratchet arms 41 and 42 of the clamp assembly 2 so as to be capable of being looped over a pipe 25 cradled in the notch 273 of the resilient insert 223 and pulled downwardly to be received by the ratchet arm receiving aperture 279.

An inner anvil surface 281 is formed within the ratchet arm receiving block 277 along the ratchet arm receiving aperture 279. A pawl member 283 is hingedly attached to an outside wall of the ratchet arm receiving block 277 and extends into the ratchet arm receiving aperture 279. The pawl member 283 including a series of teeth 285 spaced to engage the corresponding ratchet teeth 243 on the flexible ratchet arm 241 extending through the aperture 279. The pawl member 283 is molded in a manner such that it is resiliently urged toward the anvil surface 281 of the aperture 279 so that the ratchet arm teeth 243 are captured by the teeth 285 on the pawl member 283. The pawl member 283 includes an extension 287 which protrudes outward from the head 277 of the extension arm 275. The extension 287, when pushed outward, disengages the pawl member teeth 285 from the ratchet teeth 243 to thereby release the flexible ratchet arm 241.

As the flexible ratchet arm 241 is pulled through the ratchet arm receiving aperture 279 around a pipe 25 cradled in the notch 273 of the resilient insert 223, the pipe 25 is secured relative to the clamp assembly 202 and the resilient insert 223 is simultaneously forced downward within the base member central aperture 244. This downward motion of the resilient insert 223 forces the bottom surface 274 of the base portion 271 to come into contact with the respective bottom wall 6 or 11 of the slider bracket 1, or bottom wall 106 or 111 of the slider bracket 101, causing the clamp assembly 202 to be anchored in a set position along the slider bracket 1 or 101.

Conclusion

While the plumbing slider brackets 1 and 101 and ratchet arm pipe clamp assemblies 2 and 202 have been described and illustrated for use with plumbing pipes, they can be equally useful with other conduits including electrical or communications cables, fiber optic bundles, wire bundles, or any other elongate structure to be routed through a building structure, therefore, the terms "pipe" and "plumbing" are intended for illustrative purposes only and are not intended to be limiting. Particular details such as the generally rectangular cross sectional shape of the inner and outer bracket sections 4 and 5, the number and placement of the gripping steps 32 and 33, etc. are meant to be exemplary only, and can be varied considerably and still accomplish the intended results.

It is to be understood that slider brackets 1 and 101 are fully interchangeable, as are the pipe clamp assemblies 2 and 202. Either of the clamp assemblies 2 or 202 may be used with either of the brackets 1 or 101. It is also to be understood that other ratchet assemblies could be utilized for drawing down and holding a clamping member. For example, it is foreseen that the ratchet assembly could be constructed as a cable tie such as one comprising a strand of balls which can be threaded through a conical ratchet receiver with an inlet approximately the same size as the balls and an outlet formed from resilient quarter sections of the cone and being smaller in diameter than the balls. It is also to be understood that other mechanisms currently known in the art or later developed for drawing down the clamping member could be used, including but not limited to a hose clamp assembly and other threaded mechanisms or with straps drawn through clasps or the like. It is thus to be understood that while certain forms of the present invention have been illustrated and described herein, it is not to be limited to the specific forms or arrangement of parts described and shown.

We claim:

1. An apparatus for supporting conduit between building members, comprising:

a) an elongate bracket securable between adjacent building members;

b) a conduit clamp assembly comprising:

i) a clamp base slidably securable to said elongate bracket; said clamp base having an insert receiving opening extending through said clamp base;

ii) an insert received within said insert receiving opening; and iii) a clamping member secured to said clamp base such that said clamping member may be drawn toward said clamp base to draw a conduit positioned therebetween into engagement with a first end of said insert and thereby drive a second end of said insert into engagement with said bracket and thereby frictionally resist sliding of said clamp base relative to said bracket while securing said conduit between said clamping member and said insert in said clamp base.

2. The apparatus for supporting conduit between building members as in claim 1, wherein:

a) said clamping member comprises a flexible ratchet strap extending outward from said clamp base and having a plurality of ratchet members formed thereon; and b) a ratchet strap receiving member is connected to said clamp base opposite said flexible ratchet strap and having a ratchet strap receiving aperture extending therethrough, said ratchet strap receiving aperture being positioned and spaced such that said flexible ratchet strap may be looped over a conduit positioned between said flexible ratchet strap and said ratchet strap receiving member and extended through said ratchet strap receiving aperture, said ratchet strap receiving member including a pawl member positioned adjacent said ratchet strap receiving aperture; said pawl member being resiliently urged into engagement with said ratchet strap so as to provide a ratchet action on the ratchet members along said flexible ratchet strap.

3. The apparatus for supporting conduit between building members as in claim 1, wherein said conduit clamp assembly comprises:

a) a pair of ratchet arms extending outward from said clamp base in substantially parallel relation to one another, each said ratchet arm having a plurality of ratchet teeth formed along at least one surface thereof; and b) said clamping member includes a pair of arm receiving apertures extending therethrough, said arm receiving apertures being positioned and spaced such that each ratchet arm of said pair is extendable through a respective one of said arm receiving apertures, said clamping member also including a pawl member positioned proximate each arm receiving aperture and being resiliently urged into engagement with said ratchet arm extending through said arm receiving aperture to provide a ratchet action on the ratchet teeth of said ratchet arm.

4. The apparatus for supporting conduit between building members as in claim 1 wherein said elongate bracket comprises:

a) an inner bracket section having a first front wall, a first rear wall and a first bottom wall forming a first channel, said first front and rear walls each including an inwardly extending first flange, said inner bracket section having opposing proximate and distal ends;

b) an outer bracket section having a second front wall, a second rear wall and a second bottom wall forming a second channel, said second front and rear walls each including an inwardly extending second flange, said second bracket section having opposed proximate and distal ends; and wherein c) said outer bracket section proximate end receives said inner bracket section proximate end such that said inner bracket section fits within said second channel with said second flanges respectively overlapping said first front and rear walls and said first flanges of said first front and rear walls to hold said inner bracket section within said second channel such that said inner bracket section is telescopically extendable relative to said outer bracket section.

5. The apparatus for supporting conduit between building members as in claim 4, further comprising:

a) a first flexible tab attached to and extending outward from said inner bracket section distal end; and b) a second flexible tab attached to and extending outward from said outer bracket section distal end.

6. The apparatus for supporting conduit between building members as in claim 5, wherein said first and second flexible tabs can be bent at an angle of at least 90degrees such that said slider bracket can be mounted between two adjacent building members by attaching said flexible tabs to respective opposing inward facing surfaces of said adjacent building members.

7. The apparatus for supporting conduit between building members as in claim 6, wherein said first and second flexible tabs each have at least one mounting hole formed therein.

8. An apparatus for supporting conduit between building members, comprising:

a) an elongate bracket securable between adjacent building members and comprising;
  i) an inner bracket section having a first front wall, a first rear wall and a first bottom wall forming a first channel, said first front and rear walls each including an inwardly extending first flange, said inner bracket section having opposing proximate and distal ends;
  ii) an outer bracket section having a second front wall, a second rear wall and a second bottom wall forming a second channel, said second front and rear walls each including an inwardly extending second flange, said second bracket section having opposed proximate and distal ends; wherein
  iii) said outer bracket section proximate end receives said inner bracket section proximate end such that said inner bracket section fits within said second channel with said second flanges respectively overlapping said first front and rear walls and said first flanges of said first front and rear walls to hold said inner bracket section within said second channel such that said inner bracket section is telescopically extendable relative to said outer bracket section;

b) a conduit clamp assembly comprising:
  i) a clamp base slidably securable to said elongate bracket and having at least one gripping step formed in opposite sides thereof; said gripping steps engaging a portion of said first and second flanges in said inner or outer bracket sections to retain said clamp assembly within said elongate bracket; said clamp base having an insert receiving opening extending through said clamp base;
  ii) an insert received within said insert receiving opening; and
  iii) a clamping member secured to said clamp base by a ratchet assembly such that said clamping member may be drawn toward said clamp base to draw a conduit positioned therebetween into engagement with a first end of said insert and thereby drive a second end of said insert into engagement with said bracket and thereby frictionally resist sliding of said clamp base relative to said bracket while securing said conduit between said clamping member and said insert in said clamp base.

9. The apparatus for supporting conduit between building members as in claim 8, wherein:

a) said clamping member comprises a flexible ratchet strap extending outward from said clamp base and having a plurality of ratchet members formed thereon; and b) said ratchet assembly comprises a ratchet strap receiving member connected to said clamp base opposite said flexible ratchet strap and having a ratchet strap receiving aperture extending therethrough, said ratchet arm receiving aperture being positioned and spaced such that said flexible ratchet strap may be looped over a conduit positioned between said flexible ratchet strap and said ratchet strap receiving member and extended through said ratchet strap receiving aperture, said ratchet strap receiving member including a pawl member positioned adjacent said ratchet strap receiving aperture; said pawl member being resiliently urged into engagement with said ratchet strap so as to provide a ratchet action on the ratchet members along said flexible ratchet strap.

10. The apparatus for supporting conduit between building members as in claim 8, wherein said ratchet assembly comprises:

a) a pair of ratchet arms extending outward from said clamp base in substantially parallel relation to one another, each said ratchet arm having a plurality of ratchet teeth formed along at least one surface thereof; and b) a pair of arm receiving apertures formed in and extending through said clamping member, said arm receiving apertures being positioned and spaced such that each ratchet arm of said pair is extendable through a respective one of said arm receiving apertures, said ratchet assembly also including a pawl member positioned proximate each arm receiving aperture and being resiliently urged into engagement with said ratchet arm extending through said arm receiving aperture to provide a ratchet action on the ratchet teeth of said ratchet arm.

11. The apparatus for supporting conduit between building members as in claim 8, further comprising:
 a) a first flexible tab attached to and extending outward from said inner bracket section distal end; and
 b) a second flexible tab attached to and extending outward from said outer bracket section distal end.

12. The apparatus for supporting conduit between building members as in claim 11, wherein said first and second flexible tabs can be bent at an angle of at least 90degrees such that said slider bracket can be mounted between two adjacent building members by attaching said flexible tabs to respective opposing inward facing surfaces of said adjacent building members.

13. The apparatus for supporting conduit between building members as in claim 12, wherein said first and second flexible tabs each have at least one mounting hole formed therein.

14. An apparatus for supporting conduit between building members, comprising:
 a) a slider bracket comprising:
  i) an elongate inner bracket section which is substantially U-shaped in cross section with a first front wall, a first rear wall and a first bottom wall forming a first channel, said first front and rear walls each including a first extension which extends inward into said first channel and downward toward said first bottom wall, said inner bracket section having opposing proximate and distal ends;
  ii) an elongate outer bracket section which is substantially U-shaped in cross section with a second front wall, a second rear wall and a second bottom wall forming a second channel, said second front and rear walls each including a second extension which extends inward into said second channel and downward toward said second bottom wall, said second bracket section having opposed proximate and distal ends; wherein
  iii) said outer bracket section proximate end receives said inner bracket section proximate end such that said inner bracket section fits within said second channel with said second extensions respectively overlapping said first front and rear walls and said first extensions of said first front and rear walls to hold said inner bracket section within said second channel such that said inner bracket section is telescopically extendable relative to said outer bracket section;
 b) a pipe clamp assembly comprising:
  i) a base frame comprising:
   1) a plurality of downward extending legs;
   2) at least one gripping step formed in each said leg, each said gripping step engaging a portion of one of said inner or outer bracket sections to retain said clamp assembly within said slider bracket;
   3) a central opening formed within said base frame between said downward extending legs;
  ii) a flexible ratchet arm extending outward from said base frame and having a plurality of ratchet teeth formed along at least one surface thereof;
  iii) a ratchet arm receiving block connected to said base frame opposite said flexible ratchet arm and having a ratchet arm receiving aperture formed therethrough, said ratchet arm receiving aperture being positioned and spaced such that said flexible ratchet arm may be looped over a conduit positioned between said flexible ratchet arm and said ratchet arm receiving block and extend through said ratchet arm receiving aperture, said ratchet arm receiving block also including an anvil surface and a hinged pawl member positioned proximate said arm receiving aperture on opposing sides thereof, said pawl member being resiliently urged toward said opposing anvil surface so as to provide a ratchet action on the ratchet teeth along said flexible ratchet arm as it extends through said arm receiving aperture between the pawl member and the anvil surface;
  iv) a resilient insert received within said base frame central opening, and wherein;
  v) the conduit clamped between said base member and said flexible ratchet arm will engage an upper surface of said resilient insert and force said resilient insert downward within said base frame central opening such that a lower portion of said resilient insert extends downward beyond said base frame to engage said bottom wall of said inner bracket section or said bottom wall of said outer bracket section to thereby anchor said pipe clamp assembly in place within said slider bracket.

15. The apparatus for supporting conduit between building members as in claim 14, wherein said pawl member further comprises a pawl extension which protrudes outward from the arm receiving aperture, said pawl extension, when urged away from the opposing anvil surface, acting to disengage the pawl member from the ratchet teeth along said flexible ratchet arm as it extends through said arm receiving aperture between the pawl member and the anvil surface.

16. The apparatus for supporting conduit between building members as in claim 14, said slider bracket further comprising:
 a) a first flexible tab attached to and extending outward from said inner bracket section distal end; and
 b) a second flexible tab attached to and extending outward from said outer bracket distal end.

17. The apparatus for supporting conduit between building members as in claim 16, wherein said first and second flexible tabs can be bent at an angle of at least 90degrees such that said slider bracket can be mounted between two adjacent building members by attaching said flexible tabs to respective opposing inward facing surfaces of said adjacent building members.

18. The apparatus for supporting conduit between building members as in claim 16, wherein said first and second flexible tabs each have at least one mounting hole formed therein.

* * * * *